United States Patent
Song et al.

(10) Patent No.: US 12,467,682 B2
(45) Date of Patent: Nov. 11, 2025

(54) REFRIGERATOR AND CONTROL METHOD THEREOF

(71) Applicant: LG ELECTRONICS INC., Seoul (KR)

(72) Inventors: Youngseung Song, Seoul (KR); Min Hyuk Park, Seoul (KR); Sangbok Choi, Seoul (KR); Yun Su Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 18/266,561

(22) PCT Filed: Nov. 12, 2021

(86) PCT No.: PCT/KR2021/016583
§ 371 (c)(1),
(2) Date: Jun. 9, 2023

(87) PCT Pub. No.: WO2022/131565
PCT Pub. Date: Jun. 23, 2022

(65) Prior Publication Data
US 2024/0044568 A1 Feb. 8, 2024

(30) Foreign Application Priority Data
Dec. 14, 2020 (KR) .................. 10-2020-0174464

(51) Int. Cl.
*F25D 23/02* (2006.01)

(52) U.S. Cl.
CPC ........ *F25D 23/028* (2013.01); *F25D 2600/00* (2013.01)

(58) Field of Classification Search
CPC ............... F25D 2700/02; F25D 23/028; F25D 2600/00; F25D 11/022
See application file for complete search history.

(56) References Cited

U.S. PATENT DOCUMENTS

2017/0074568 A1* 3/2017 Orozco ................. F25B 49/02

* cited by examiner

*Primary Examiner* — Cassey D Bauer
(74) *Attorney, Agent, or Firm* — Bryan Cave Leighton Paisner LLP

(57) ABSTRACT

In a refrigerator and control method thereof according to the present disclosure, when a load operation is terminated and a normal storage operation is performed, a re-input prevention control is performed to prevent the load operation from being performed even if an operation start condition of the load operation is satisfied. During the re-input prevention control, when a re-input prevention stop condition is satisfied, the re-input prevention control is controlled to be stopped. In this way, it is possible to prevent over-cooling of a first storage compartment, which may be caused by continuous input of the load operation, and respond smoothly to the corresponding load when a large load is input.

18 Claims, 8 Drawing Sheets

【Figure 1】
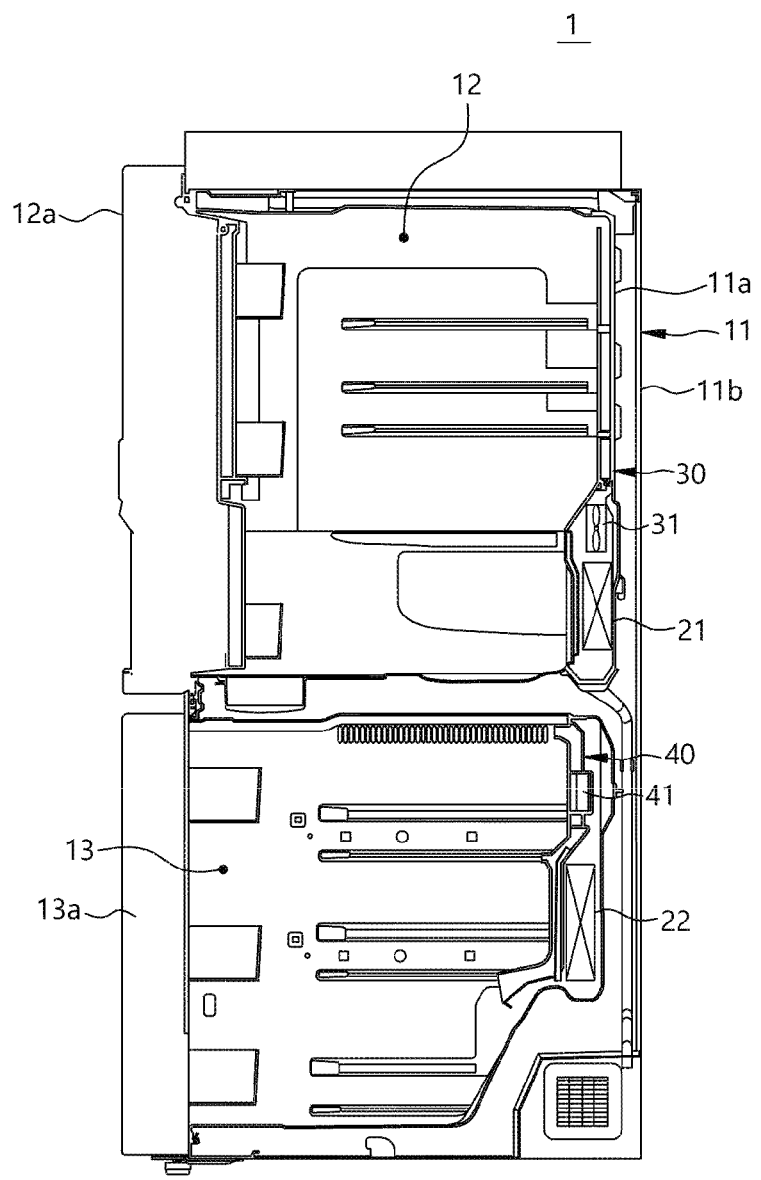

[Figure 2]
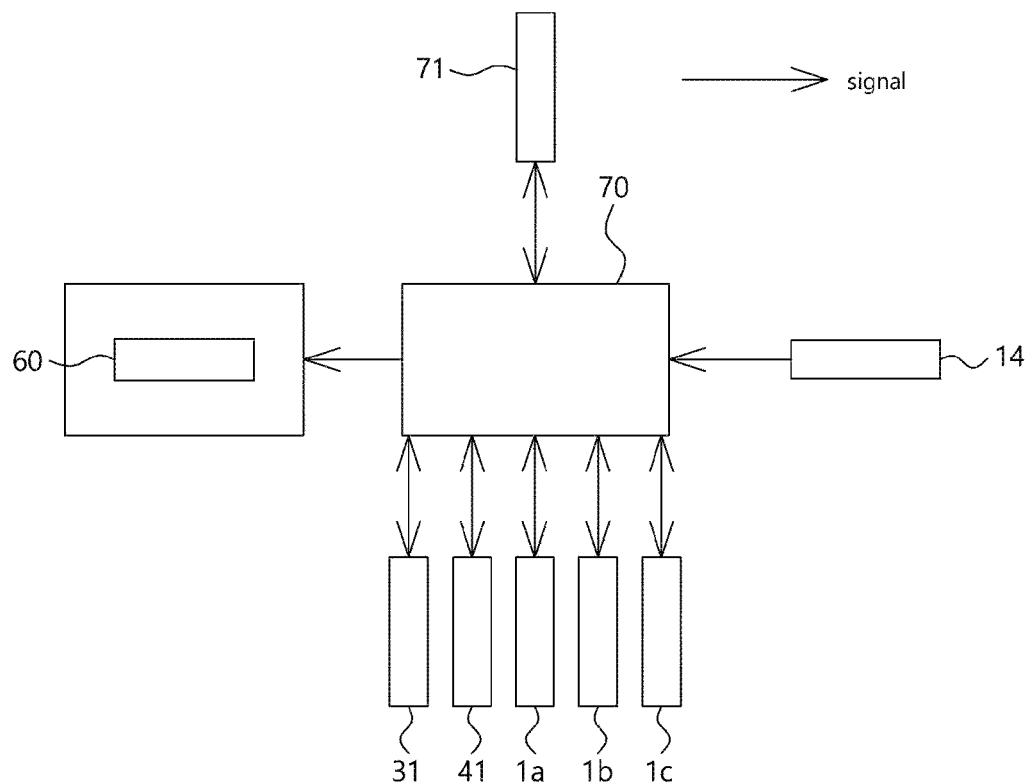
[Figure 3]
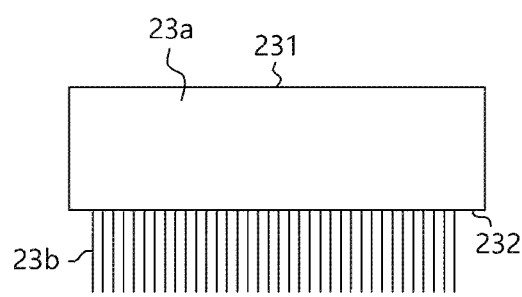

[Figure 4]
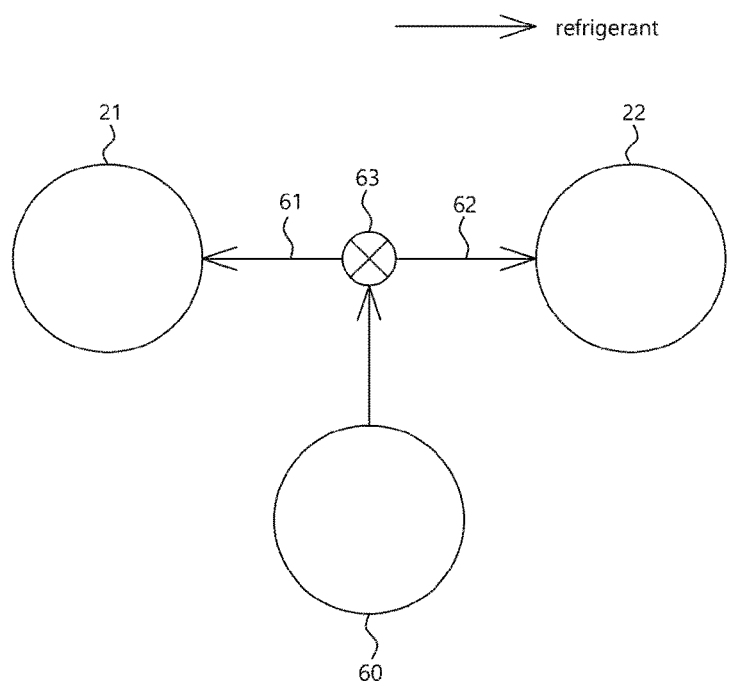
[Figure 5]
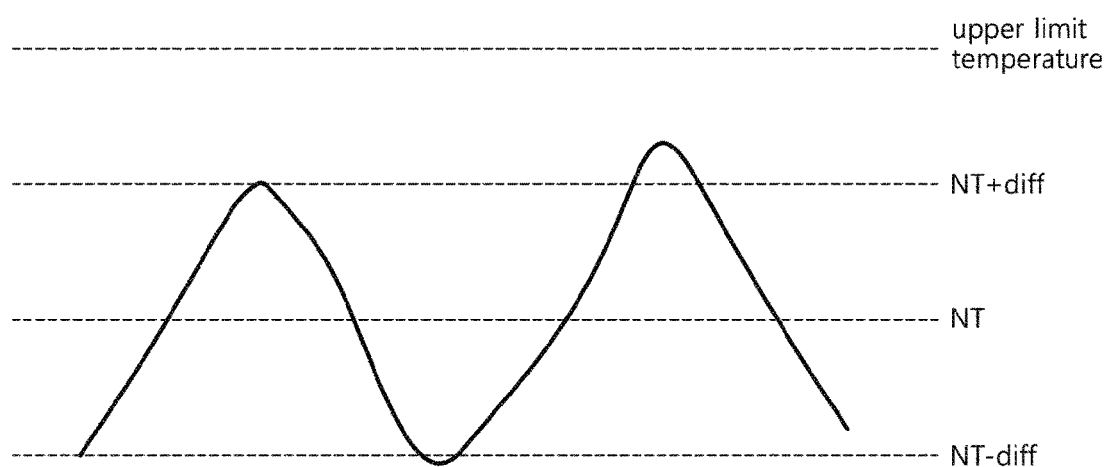

【Figure 6】
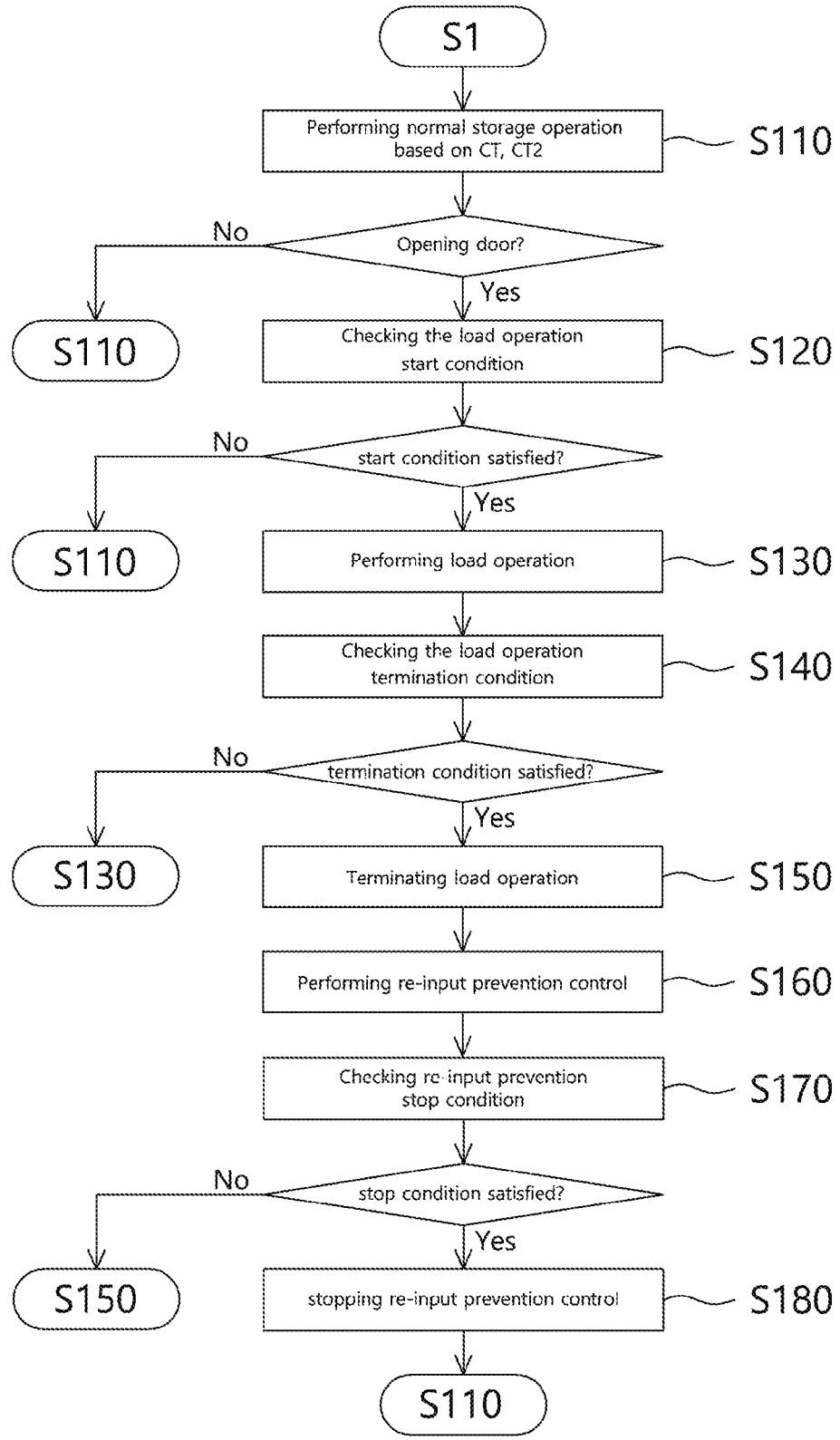

【Figure 7】
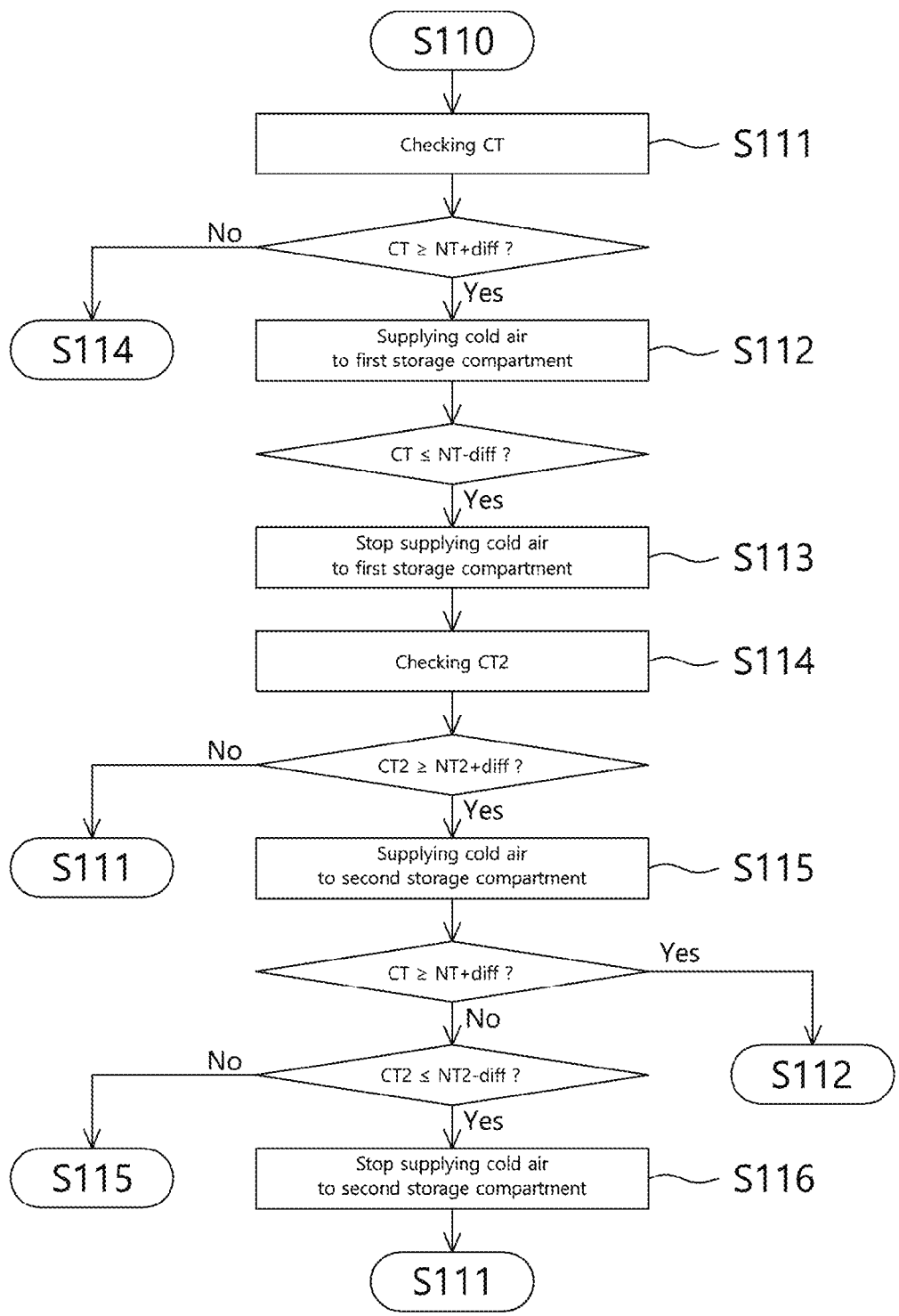

[Figure 8]
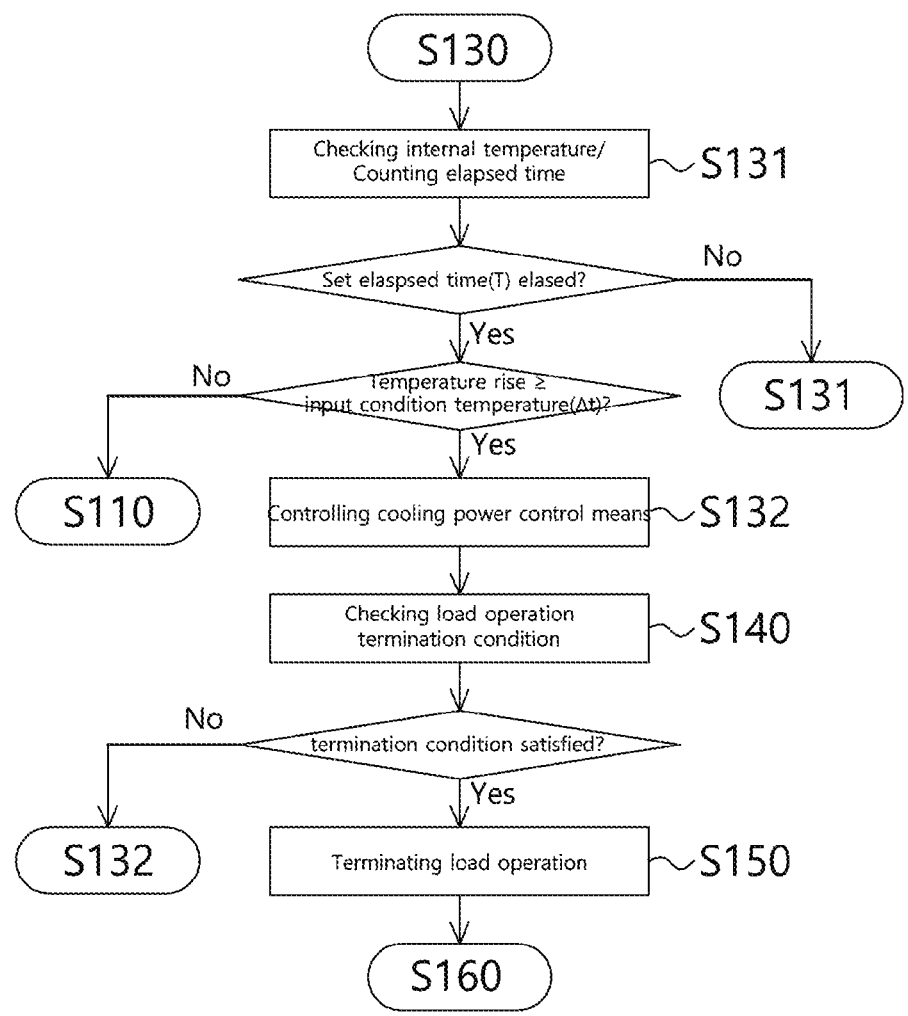

【Figure 9】
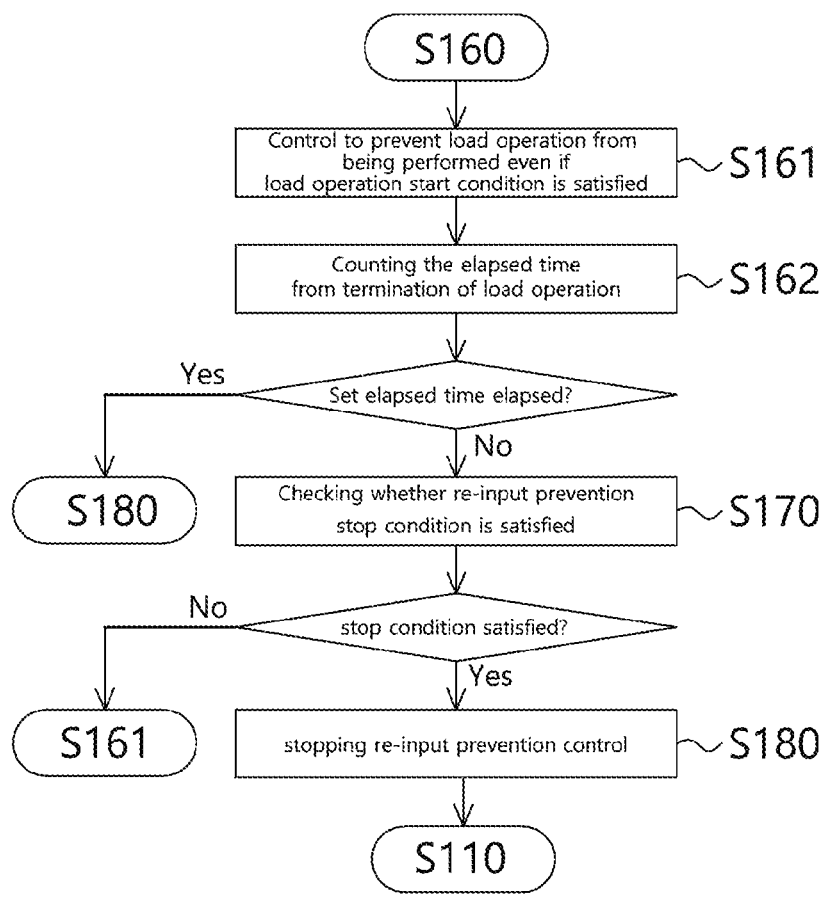

REFRIGERATOR AND CONTROL METHOD THEREOF

CROSS REFERENCE TO RELATED APPLICATION

This application is the National Stage filing under 35 U.S.C. 371 of International Application No. PCT/KR2021/016583, filed on Nov. 12, 2021, which claims priority to Korean Patent Application No. 10-2020-0174464 filed on Dec. 14, 2020, the entire contents of which are incorporated herein for all purposes by this reference.

TECHNICAL FIELD

The present disclosure relates to a refrigerator and control method thereof in which a load operation is performed to prevent an excessive rise in temperature inside a refrigerator when a door of a storage compartment is opened.

BACKGROUND ART

In general, a refrigerator is a device that may store objects in a storage space for a long time or while maintaining a constant temperature by using cold air.

The refrigerator includes a refrigeration system including a compressor and an evaporator to generate and circulate cold air.

A temperature control for a storage compartment operates the compressor to supply cold air into the storage compartment when the temperature rises further than an upper limit notch temperature (NT+diff) based on a set notch temperature (NT) of the storage compartment, and when the temperature decreases further than a lower limit notch temperature (NT−diff) based on the set notch temperature (NT), the operation of the compressor is stopped to block the cold air supplied to the storage compartment.

Meanwhile, the temperature in the storage compartment may rise even though the refrigeration system is not broken during a normal storage operation for the storage compartment.

It may be a case when hot food is stored in the storage compartment or when an indoor air outside the refrigerator is introduced into the refrigerator as a door of the refrigerator is opened for a long time.

In the prior arts, when a door is opened, a load operation is performed with maximum cooling power such that an inside of the storage compartment is quickly reached to a normal storage temperature.

While the load operation has an advantage of protecting food in the storage compartment by quickly stabilizing the temperature of the storage compartment, it also has a disadvantage of lowering the power efficiency.

In relation to the load operation, various methods are provided, such as Korean Patent No. 10-2017-0087440, Korean Patent No. 10-2020-0105183, and Korean Patent No. 10-2020-0087049.

Meanwhile, the load operation according to the prior arts may cause over-cooling because the operation is performed with maximum cooling power for a set time or until a set temperature is reached, even though the temperature in the refrigerator is reached a satisfaction region.

For example, if the load operation is performed at the maximum cooling power for a set time, even though the temperature in a first storage compartment maintained at a relatively high temperature area (above zero temperature) among two storage compartments that are kept at different temperature area is between a set notch temperature (NT) and a lower limit notch temperature (NT−diff), over-cooling occurs. This means that the temperature of the first storage compartment drops below the lower limit notch temperature (NT−diff).

Of course, the end of the load operation is performed based on the temperature of the storage compartment. However, in the prior arts, since the temperature of the storage compartment for the end of the load operation is set to the lower limit notch temperature (NT−diff), even if the temperature of the storage compartment reaches the lower limit notch temperature (NT−diff) by the load operation and the load operation is ended, the temperature is lowered to an over-cooling area due to the inertia of temperature.

In particular, the load operation is performed when the temperature of the storage compartment exceeds a set temperature (e.g., 2° C.) for a set time (e.g., 5 minutes after the door is opened). The load operation may be continuously performed even after the load operation is terminated.

Accordingly, in the prior arts, when the load operation is continuously performed, over-cooling of a first storage compartment maintained in a relatively high temperature (above zero temperature) area among the two storage compartments maintained in different temperature areas may occur, causing the stored items in the first storage compartment to freeze.

In addition, when the load operation is continuously performed only in the first storage compartment, the temperature in a second storage compartment maintained in a relatively low temperature (below zero temperature) area does not reach a satisfaction region and remains in a dissatisfaction region.

DISCLOSURE

Technical Problem

The present disclosure is devised to solve various problems according to the prior arts described above. A purpose of the present disclosure is to provide a refrigerator and a control method thereof capable of reducing power consumption due to a continuous load operation by performing a re-input prevention control to prevent the load operation from being performed even if a start condition of the load operation is satisfied when the load operation is terminated and a normal storage operation is performed.

Another purpose of the present disclosure is to stop the re-input prevention control when a re-input prevention stop condition of the load operation is satisfied while the re-input prevention control is being performed, and to perform the load operation if the start condition of load operation is satisfied. Through this, it is possible to prevent over-cooling of the stored items.

Technical Solution

According to a refrigerator of the present disclosure, a load operation may be performed when a start condition of a load operation is satisfied.

According to the refrigerator of the present disclosure, the load operation may be terminated and a normal storage operation may be performed when a termination condition of the load operation is satisfied.

According to the refrigerator of the present disclosure, it may be configured to perform a re-input prevention control that prevents re-input of the load operation when a condition is satisfied.

According to the refrigerator of the present disclosure, when the load operation is terminated and the normal storage operation is performed, the re-input prevention control may be performed.

According to the refrigerator of the present disclosure, when the re-input prevention control is performed, the load operation is not performed even if the load operation start condition is satisfied.

According to the control method of the refrigerator of the present disclosure, when the load operation is terminated, the normal storage operation may be performed until the re-input prevention stop condition is satisfied.

According to the control method of the refrigerator of the present disclosure, the re-input prevention control may be stopped when the re-input prevention stop condition is satisfied According to the refrigerator and the control method thereof of the present disclosure, the re-input prevention control may be performed during a preset re-input prevention time after the load operation is terminated.

According to the refrigerator and the control method thereof of the present disclosure, the re-input prevention stop condition of the load operation may include a case where a temperature in a first storage compartment is within a satisfaction region at least twice or more during the normal storage operation after the load operation is terminated.

According to the refrigerator and the control method thereof of the present disclosure, the re-input prevention stop condition of the load operation may include a case where both the first and a second storage compartments have temperatures that are within the satisfaction region when the normal storage operation is performed after the load operation is terminated.

According to the refrigerator and the control method thereof of the present disclosure, the re-input prevention stop condition of the load operation may include a case where a cooling power control means is turned off when the normal storage operation is performed after the load operation is terminated.

According to the refrigerator and the control method thereof of the present disclosure, the re-input prevention stop condition of the load operation may include a case where the temperature in the first storage compartment is within the satisfaction region when the door of the first storage compartment is opened while the re-input prevention control is being performed after the load operation is terminated.

According to the refrigerator and the control method thereof of the present disclosure, the satisfaction region of the temperature in the first storage compartment may be a temperature region between an upper limit notch temperature (NT+diff) and a lower limit notch temperature (NT−diff).

According to the refrigerator and the control method thereof of the present disclosure, the satisfaction region of the temperature in the first storage compartment may be a temperature region between a set notch temperature (NT) and the upper limit notch temperature (NT+diff).

According to the refrigerator and the control method thereof of the present disclosure, the satisfaction region of the temperature in the first storage compartment may be a temperature region between the set notch temperature (NT) and the lower limit notch temperature (NT−diff).

According to the refrigerator and the control method thereof of the present disclosure, in the normal storage operation step, the satisfaction region of the internal temperature of the refrigerator may be a temperature region between the upper limit notch temperature (NT+diff, NT2+diff) and the lower limit notch temperature (NT−diff, NT2−diff) of each storage compartment.

According to the refrigerator and the control method thereof of the present disclosure, the re-input prevention stop condition of the load operation in the re-input prevention step may include a case where the preset re-input prevention time elapses after the load operation is terminated.

According to the refrigerator and the control method thereof of the present disclosure, when the re-input prevention stop condition of the load operation is satisfied while the re-input prevention step is being performed, the re-input prevention control is stopped and the normal storage operation may be performed.

According to the refrigerator and the control method thereof of the present disclosure, after the re-input prevention control is stopped, when the start condition of the load operation is satisfied during the normal storage operation, the load operation may be performed.

Advantageous Effect

As described above, the refrigerator and the control method of the present disclosure have an effect of preventing over-cooling of the first storage compartment by preventing the continuous input of the load operation while performing the re-input prevention control until the re-input prevention time elapses after the load operation is terminated.

The refrigerator and its control method according to the present disclosure allows the load operation to be performed while the re-input prevention control is stopped when the re-input prevention stop condition is satisfied even before the re-input prevention time elapses after the load operation is terminated, thereby preventing omission of load operation for an excessive load.

DESCRIPTION OF DRAWINGS

FIG. 1 is a state diagram showing an internal structure of a refrigerator according to an embodiment of the present disclosure.

FIG. 2 is a block diagram schematically showing a structure for a load operation of the refrigerator according to the embodiment of the present disclosure.

FIG. 3 is a schematic state diagram showing the structure of a thermoelectric module according to the embodiment of the present disclosure.

FIG. 4 is a block diagram schematically showing a refrigeration cycle of the refrigerator according to the embodiment of the present disclosure.

FIG. 5 is a diagram schematically showing an operation state performed according to an operation base value based on a user-set notch temperature for a refrigerator storage compartment according to the embodiment of the present disclosure.

FIG. 6 is a flowchart showing a control process of the refrigerator according to the embodiment of the present disclosure.

FIG. 7 is a flowchart explaining in detail a process of performing a normal storage operation among the control processes of the refrigerator according to the embodiment of the present disclosure.

FIG. 8 is a flowchart showing a process of performing the load operation among the control processes of the refrigerator according to the embodiment of the present disclosure in detail.

FIG. 9 is a flowchart explaining in detail a process of performing re-input prevention control among the control processes of the refrigerator according to the embodiment of the present disclosure.

BEST MODE

Figure 10:
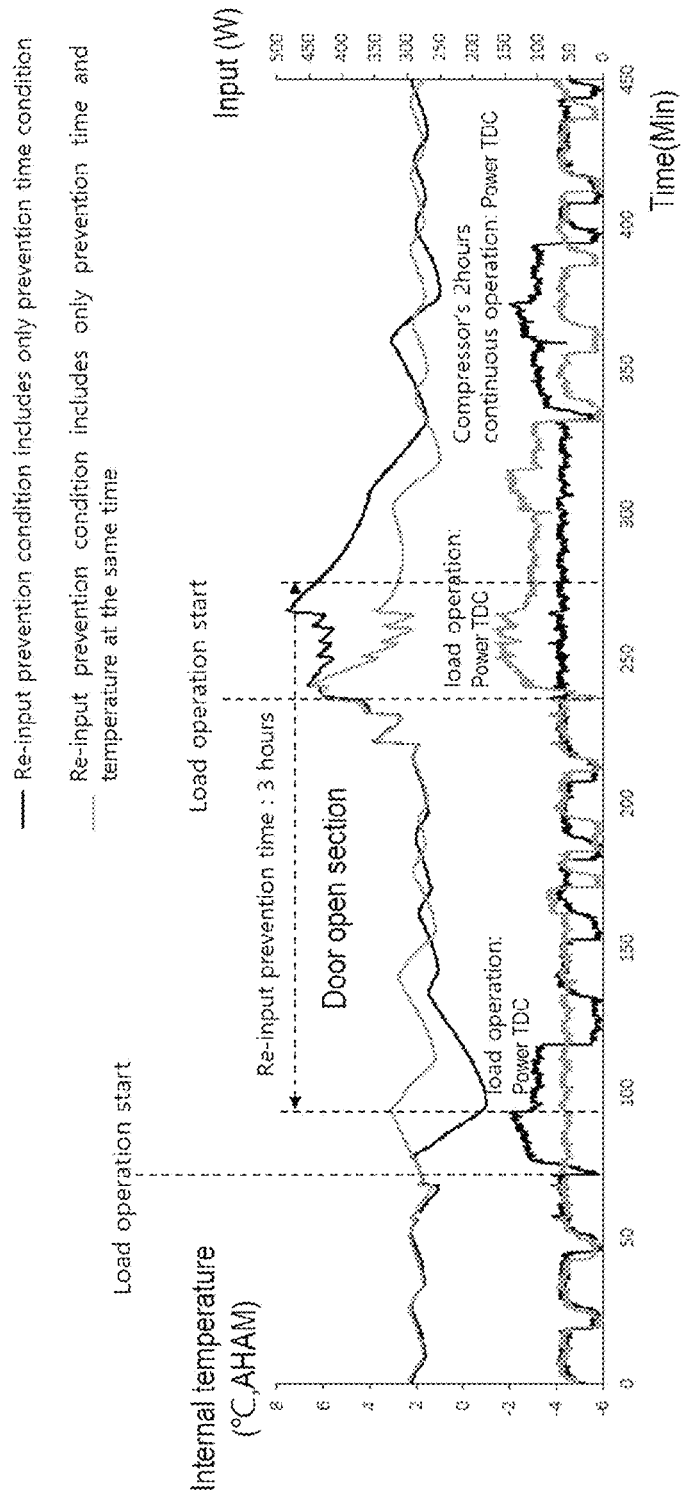
FIG. 10 is a graph for explaining the relationship between the temperature of a storage compartment and an input load for each operation time by controlling the refrigerator according to the embodiment of the present disclosure.

Hereinafter, preferred embodiments of a refrigerator and a control method thereof according to the present disclosure will be described with reference to FIGS. 1 to 10.

FIG. 1 is a state diagram illustrating an internal structure of the refrigerator according to the embodiment of the present disclosure, and FIG. 2 is a block diagram schematically illustrating a structure for a load operation of the refrigerator according to an embodiment of the present disclosure.

As shown in these drawings, the refrigerator according to the embodiment of the present disclosure may determine a cooling power of a cooling control means considering temperatures of a first storage compartment and a second storage compartment when an emergency operation is performed, thereby reducing power consumption and preventing over-cooling.

The refrigerator according to the embodiment of the present disclosure will be described in more detail.

First, the refrigerator according to the embodiment of the present disclosure includes a cabinet 11.

The cabinet 11 includes an inner-casing 11a forming an interior wall of the refrigerator 1 and an outer casing 11b forming an exterior, and a storage compartment in which a stored material is stored is provided by the cabinet 11.

Only one storage compartment may be provided or two or more storage compartments may be provided. In an embodiment of the present disclosure, for example, two storage compartments for storing stored materials in different temperature regions are included.

The storage compartment may include a first storage compartment 12 maintained at a first set notch temperature (NT).

The first set notch temperature (NT) may indicate a temperature area where the storage is not frozen, but it may be in a lower than a temperature (room temperature) outside the refrigerator 1.

For example, the first set notch temperature (NT) may be set to a temperature of the storage compartment of less than or equal to 32° C. and greater than 0° C. Of course, the first set notch temperature (NT) may be set higher than 32° C., or equal to or lower than 0° C., if necessary (e.g., depending on the indoor temperature or the type of storage).

In particular, the first set notch temperature (NT) may be the temperature (CT; Compartment Temperature) of the first storage compartment 12 set by a user, and if the user does not set the first set notch temperature (NT), a predetermined specified temperature is used as the first set notch temperature (NT).

The first storage compartment 12 is subjected to a normal storage operation at a first operation base value (NT±diff) to maintain the first set notch temperature (NT).

The first operation base value (NT±diff) is a temperature area value of a satisfaction region including a first lower limit notch temperature (NT−diff) and a first upper limit notch temperature (NT+diff).

That is, when the temperature (CT) of the first storage compartment 12 reaches the first lower limit notch temperature (NT−diff) based on the first set notch temperature (NT), the operation for supplying cold air is stopped. On the other hand, when the temperature (CT) of the storage compartment rises based on the first set notch temperature (NT), the operation for supplying cold air resumes before reaching the first upper limit notch temperature (NT+diff).

As such, in the first storage compartment 12, cold air is supplied or stopped in consideration of the first operation base value (NT±diff) of the first storage compartment 12 based on the first set notch temperature (NT) and thus the normal storage operation is performed.

The first set notch temperature (NT) and the first operation base value (NT±diff) are as shown in FIG. 3.

The storage compartment may include a second storage compartment 13 maintained at a second set notch temperature (NT2).

The second set notch temperature (NT2) may be lower than the first set notch temperature (NT). In this case, the second set notch temperature (NT2) may be set by the user, and when the user does not set it, a predetermined specified temperature is used.

The second set notch temperature (NT2) may be a temperature sufficient to freeze the storage. For example, the second set notch temperature (NT2) may be set to a temperature of equal to or lower than 0° C. or equal to or higher than −24° C.

Of course, the second set notch temperature (NT2) may be set higher than 0° C., or equal to or lower than −24° C., as necessary (e.g., depending on the room temperature or type of storage).

In particular, the second set notch temperature (NT2) may be the temperature of the second storage compartment 13 set by the user, and if the user does not set the second set notch temperature (NT2), a predetermined specified temperature may be used as the second set notch temperature (NT2).

The second storage compartment 13 may be operated at a second operation base value (NT2±diff) to maintain the second set notch temperature (NT2).

The second operation base value (NT2±diff) is a temperature area value of a satisfaction region including a second lower limit notch temperature (NT2−diff) and a second upper limit notch temperature (NT2+diff).

That is, when the temperature of the second storage compartment 13 reaches the second lower limit notch temperature (NT2−diff) based on the second set notch temperature (NT2), the operation for supplying cold air may be stopped. On the other hand, when the temperature of the storage compartment rises based on the second set notch temperature (NT2), the operation for supplying cold air resumes before reaching the second upper limit notch temperature (NT2+diff).

As such, in the second storage compartment 13, cold air is supplied or stopped in consideration of the second operation base value (NT2±diff) for the second storage compartment 13 based on the second set notch temperature (NT2).

In particular, the first operation base value (NT±diff) may be set to have a smaller area between the upper limit notch temperature (NT+diff) and the lower limit notch temperature (NT−diff) than the second operation base value (NT2±diff).

For example, the first lower limit notch temperature (NT−diff) and the first upper limit notch temperature (NT+diff) of the first operation base value (NT±diff) may be set to ±2.0° C., and the second lower limit notch temperature (NT2−diff) and the second upper limit notch temperature (NT2+diff) of the second operation base value (NT2±diff) may be set to ±1.5° C.

Meanwhile, each of the above-described storage compartments 12 and 13 is configured such that the temperature of the storage compartment is maintained while a fluid is circulated.

The fluid may be air. In the following description, an example is that the fluid circulating through the storage compartments 12 and 13 is air. Of course, the fluid may be a gas other than air.

The temperature outside the storage compartments 12 and 13 (room temperature) may be measured by a room temperature sensor 1a, and the internal temperature (temperatures inside the first storage compartment and the second compartment) (CT) may be measured by internal temperature sensors 1b and 1c. (refer to FIG. 2 attached).

Each of the temperature sensors 1a, 1b, and 1c may be performed separately. Of course, the room temperature and each internal temperature (CT) may be measured by a single temperature sensor, or may be configured to be measured by two or more temperature sensors cooperatively.

Doors 12a and 13a are provided in the storage compartments 12 and 13.

The doors 12a, 13a serve to open and close the storage compartments 12, 13, and may be configured as a rotary opening/closing structure or a drawer type opening/closing structure.

The doors 12a and 13a may be provided in one or more plurality.

In particular, at least any one of the doors 12a and 13a or the cabinet 11 may have a detection sensor 14 capable of detecting whether the doors 12a and 13a are open.

Next, the refrigerator 1 according to an embodiment of the present disclosure includes a cooling source.

The cooling source is configured to generate cold air.

Such a cooling source may be configured in various ways.

For example, the cooling source may be composed of a thermoelectric module 23.

In this case, the thermoelectric module 23 may include a thermoelectric element 23a including a heat absorbing surface 231 and a heat generating surface 232, and a sink 23b connected to at least one of the heat absorbing surface 231 and the heat generating surface 232, as shown in FIG. 3.

The cooling source may be composed of evaporators 21 and 22.

The evaporators 21 and 22 form the refrigeration system with the compressor 60 (see attached FIG. 4), a condenser (not shown), and an expander (not shown), and operate to lower the temperature of the air while exchanging heat with air passing through the evaporator.

When the storage compartment includes the first storage compartment 12 and the second storage compartment 13, the evaporator may consist of a first evaporator 21 for supplying cold air to the first storage compartment 12 and a second evaporator 22 for supplying cold air to the second storage compartment 13.

In this case, the first evaporator 21 may be located at a rear side of the first storage compartment 12 in the inner casing 11a, and the second evaporator 22 may be located at a rear side of the second storage compartment 13 in the inner casing 11a.

Although not shown, the evaporator may be provided only in at least one of the first storage compartment 12 or the second storage compartment 13.

In addition, even if the two evaporators 21 and 22 are provided, only one compressor 60 constituting the corresponding refrigeration system may be provided.

In this case, as shown in FIG. 4, the compressor 60 may be connected to supply the refrigerant to the first evaporator 21 through a first refrigerant passage 61 and may be connected to supply the refrigerant to the second evaporator 22 through a second refrigerant passage 62. In this case, each of the refrigerant passages 61 and 62 may be selectively opened and closed using a refrigerant valve 63.

Next, the refrigerator 1 according to the embodiment of the present disclosure includes a cooling power control means.

The cooling power control means is provided to control a cooling power of the cold air supplied to the first storage compartment 12.

The cooling power control means may be configured to control a load by a controller 70, and the cooling power control means may include at least one of a compressor 60 and a first cooling fan 31.

Here, the compressor 60 is one of the components that forms a refrigeration system with the cooling sources (evaporators) 21 and 22, and the cooling power may be controlled by adjusting the load of the compressor 60.

The first cooling fan 31 is a device for supplying cold air generated while passing through the first evaporator 21 to the first storage compartment 12. Cooling power may be controlled by adjusting the load (rotation speed control) of the first cooling fan 31.

Of course, the refrigerator may further include a second cooling fan 41 supplying cold air generated while passing through the second evaporator 22 to the second storage compartment 13, or the first cooling fan 31 (or the second cooling fan) may be configured to supply cold air generated while passing through the first evaporator 21 or the second evaporator 22 to the second storage compartment 13.

Next, the refrigerator 1 according to the embodiment of the present disclosure includes a controller 70. The controller 70 may be a microprocessor, an electrical logical circuit, and the like.

The controller 70 may be configured to control a load and operation of the cooling power control means. That is, the controller 70 controls the load and operation of the compressor 60 and the first cooling fan 41 constituting the cooling power control means based on a temperature measured by the room temperature sensor 1a and the internal refrigerator temperature sensors 1b and 1c, and each storage compartment 12 and 13 is controlled to maintain each set notch temperature (NT, NT2).

Based on the first set notch temperature (NT), the temperature area between the first upper limit notch temperature (NT+diff) and the first lower limit notch temperature (NT−diff) may be set as a satisfaction region, and a temperature higher than the first upper limit notch temperature (NT+diff) may be set as a dissatisfaction region.

Based on the second set notch temperature (NT2), the temperature area between the second upper limit notch temperature (NT2+diff) and the second lower limit notch temperature (NT2−diff) may be set as a satisfaction region, and a higher temperature than the second upper limit notch temperature (NT2+diff) may be set as a dissatisfaction region. In this regard, it is as illustrated in FIG. 5 attached.

The controller 70 may be configured to control the supply of cold air alternately to the two storage compartments 12 and 13.

In this case, the controller 70 considers the temperature of the first storage compartment 12 first when operating.

That is, when the temperature (CT) of the first storage compartment 12, is in the dissatisfaction region, cold air is supplied to the first storage compartment 12 regardless of the temperature (CT2) of the second storage compartment 13. When the temperature (CT) of the first storage compartment 12 is in the satisfaction region, cold air is controlled to be supplied to the second storage compartment 13.

Of course, when a part of the flow path supplying cold air to the two storage compartments 12 and 13 is formed to be shared with each other, some portion of cold air may be supplied to the second storage compartment 13 while cold air is supplied to the first storage compartment 12, or alternatively, while cold air is being supplied to the second storage compartment 13, some of the cold air may also be supplied to the first storage compartment 12.

The controller 70 may be configured to perform the normal storage operation on the first storage compartment 12 or the second storage compartment 13.

In the normal storage operation, when the temperature (CT, CT2) in each storage compartment 12 and 13 reaches the lower limit notch temperature (NT−diff, NT2-diff) based on the set notch temperature (NT, NT2), the supply of cold air is stopped. And the temperature (CT, CT2) rises based on the set notch temperature (NT, NT2), the operation for supplying cold air is resumed before (or when reaching) the upper limit notch temperatures (NT+diff, NT2+diff).

In this normal storage operation, cold air is alternately supplied to each of the storage compartments 12 and 13, and the temperature of each compartment (CT, CT2) maintains between the upper limit notch temperature (NT+diff, NT2+diff) and the lower limit notch temperature (NT−diff, NT2−diff).

In addition, the controller 70 may be configured to perform a load operation for the first storage compartment 12 or the second storage compartment 13.

The load operation may be performed with higher cooling power than the normal storage operation. Of course, the load operation may be performed with the maximum cooling power that may be provided by the cooling power control means.

In addition, the load operation may be performed when a start condition of the load operation is satisfied while the refrigerator is operated by the normal storage operation.

The start condition of the load operation includes a condition in which one of the doors 12a, 13a is opened. After one door is opened, any one of the following conditions may be further included: a condition in which the internal temperature rises above the set condition temperature (Δt) within the set elapsed time (T); a condition in which the temperature (CT, CT2) of at least one of the storage compartments 12, 13 is in the dissatisfaction region when one of the doors 12a, 13a is opened; a condition in which a rate of temperature change per unit time for the temperature in the corresponding storage compartment 12, 13 after one of the doors 12a, 13a is opened is higher than a preset change rate.

In addition, the controller 70 may be configured to terminate the load operation when the termination condition of the load operation is satisfied.

The termination condition of the load operation may include a condition in which the temperatures (CT, CT2) of each storage compartment 12, 13 are both in the satisfaction region, or a condition in which the temperatures (CT, CT2) of each storage compartment (12, 13) are lowered to a set temperature or less.

In addition, the controller 70 may be configured to re-perform the normal storage operation when the load operation is terminated.

In addition, when the doors 12a and 13a are reopened during the load, the controller 70 may control the load operation to be performed while operating the cooling power control means (compressor or first cooling fan) with the maximum load.

That is, when the doors 12a and 13a are reopened during the load operation, the maximum cooling power may be provided when the doors 12a and 13a are closed regardless of whether the operation start condition is satisfied.

The maximum load is a load sufficient to provide a higher cooling power than the cooling power during the normal storage operation, and is preferably a load for providing the maximum cooling power capable of being performed by the cooling power control means.

The maximum cooling power described above is performed until a predetermined time elapses after the re-performance of the load operation, and thereafter, it is more preferable to control the cooling power to be varied according to the temperature of the storage compartments 12, 13.

In addition, when the load operation is terminated and the normal storage operation is performed, the controller 70 may perform re-input prevention control so that the load operation is not performed even if the operation start condition of the load operation is satisfied.

That is, when the load operation is continuously performed, the cold air with high cooling power is provided to the first storage compartment 12, which may cause over-cooling while the temperature of the second storage compartment 13 may be maintained in the dissatisfaction region. Considering this, it is possible to prevent overcooling of the first storage compartment 12 or dissatisfaction in the second storage compartment 13 due to continuous load operation by performing the re-input prevention control.

The re-input prevention control may be performed for a preset re-input prevention time after the load operation is terminated. That is, when the set re-input prevention time elapses, the re-input prevention control is terminated, and the load operation is possible to perform.

In addition, the controller 70 may control the re-input prevention control to be immediately terminated when a certain condition (re-input prevention stop condition) is satisfied, even though the re-input prevention time is not elapsed during the normal storage operation.

That is, if continuous load operation is unconditionally blocked, the temperature rise may not be solved even if a rapid temperature rise occurs due to an input of a high temperature storage material into the storage compartments 12, 13 after the load operation is terminated. Therefore, when the above-described re-input prevention stop condition is satisfied, the re-input prevention control is stopped and the load operation may be input.

In this re-input prevention stop condition may include a case where the temperatures of the first storage compartment 12 and the second storage compartment 13 simultaneously belong to the satisfaction region when the first storage compartment 12 and the second storage compartment 13 are alternately operated without opening the door 12a of the first storage compartment 12.

That is, when the temperatures of the two storage compartments 12, 13 belongs to the satisfaction region at the same time, it may be determined that the temperatures of the storage compartments are stabilized. In a state in which the temperatures of the storage compartments are stabilized, overcooling may not occur even if the operation start condition is satisfied and the load operation is newly performed even though the re-input prevention time is not elapsed.

Of course, it may be determined that the re-input prevention stop condition is satisfied when the temperature of the first compartment 12 falls within the satisfaction region at least twice while the first storage compartment 12 and the second storage compartment 13 are alternately operated without opening the door 12a of the first storage compartment 12, or when the temperatures of the two storage compartments 12, 13 fall within the satisfaction region at the same time even when the compressor 60 of the cooling power control means is turned off.

In addition, the re-input prevention stop condition may include a case where both the temperatures (CT and CT2) of the two storage compartments 12 and 13 fall within the satisfaction region when the door 12a of the first storage compartment 12 is opened.

That is, when the door 12a of the first storage compartment 12 is opened, if the temperatures of the two storage compartments 12 and 13 both fall within the satisfaction region, both storage compartments 12 and 13 are in a stabilized state. Accordingly, it is determined that the above state satisfies the condition for terminating the re-input prevention of the load operation, and the re-input prevention control is stopped.

At this time, the satisfaction region of the temperature of the storage compartment may be a temperature region between the upper limit notch temperature (NT+diff, NT2+diff) and the lower limit notch temperature (NT−diff, NT2−diff) set based on the set notch temperature (NT, NT2) of the storage compartments 12, 13.

More specifically, the satisfaction region of the temperature of the first storage compartment 12, the temperature may be higher than the set notch temperature (NT) or the lower limit notch temperature (NT−diff). The satisfaction region of the temperature of the second storage compartment 13, the temperature may be lower than the set notch temperature (NT2) or the upper limit notch temperature (NT2+diff).

That is, when the temperatures of the first storage compartment 12 and the second storage compartment 13 simultaneously satisfy the above temperature region, the risk of overcooling is prevented even if the load operation of the first storage compartment 12 is performed. In addition, even if the continuous load operation of the first storage compartment 12 is performed, the temperature of the second storage compartment 13 may be prevented from belonging to an excessive dissatisfaction region (a temperature region higher than the upper limit notch temperature (NT2+diff)).

In addition, the re-input prevention stop condition may be set to have a base value different from each base value of the start condition for the load operation.

For example, when the set elapsed time (T) of the start condition of the load operation is 5 minutes, the set elapsed time (T') of the re-input prevention stop condition may be 3 minutes. When the set condition temperature (Δt) among the start conditions of the load operation is 2.0° C., the set condition temperature (Δt') of the re-input prevention stop condition may be 3.0° C. That is, when the set condition temperature (Δt) is reached within the set elapsed time (T') shorter than the operation start condition, or when a higher set condition temperature (Δt') is reached during the set elapsed time (T) of the operation start condition, the load operation may be re-input, thereby preventing a sudden increase in the internal temperature of the refrigerator during the operation re-input prevention control of the load operation.

Of course, the re-input prevention stop condition may be set to have a base value different from each base value of the start conditions of the load operation.

In addition, the controller 70 may control the load operation to be stopped and a pre-defrosting operation for a defrosting operation to be preferentially performed when an input condition of the defrosting operation is satisfied while the load operation is being performed.

In particular, the pre-defrosting operation may be controlled so that the temperatures (CT, CT2) of the storage compartments 12, 13 reach a defrost performance temperature lower than the lower limit notch temperature (NT−diff, NT2−diff), while controlling the cooling power control means to operate at the maximum load.

The control of the controller 70 is to minimize the time until the defrost temperature is reached even when the temperatures of the storage compartments are in the upper limit notch temperature (NT+diff, NT2+diff) or higher than the upper limit notch temperature.

In addition, the controller 70 performs the defrosting operation after the pre-defrosting operation is terminated. After the defrosting operation is completed, the controller operates the cooling power control means at the maximum load to cool the storage compartments 12 and 13 until the temperatures (CT, CT2) reach a temperature lower than the set notch temperature (NT, NT2).

Meanwhile, according to the above-described normal storage operation and load operation, the controller 70 may be configured to differently control the load of the cooling power control means (compressor or first cooling fan).

For example, in the normal storage operation, the temperature of each storage compartment 12, 13 may be controlled to be gradually lowered while being operated in a power saving operation in consideration of power consumption of the cooling power control means (compressor or first cooling fan).

Meanwhile, in order to prevent the deterioration of food during the load operation, the cooling power control means (compressor or first cooling fan) may be controlled to operate at a higher load than in the normal storage operation, and the temperature of each storage compartment 12, 13 may be rapidly controlled to be lowered.

Next, the control method for normal storage operation, load operation, and re-input prevention control of the refrigerator according to the embodiment of the present disclosure will be described in more detail with reference to the accompanying flowcharts of FIGS. 6 to 9.

Prior to the description, each operation is performed under the control of the controller 70 which receives sensing values of the temperature sensors 1a, 1b, 1c and operates the refrigeration system.

First, as shown in the flowchart of FIG. 6, the controller 70 continuously acquires the sensing values for the storage compartment temperature (CT, CT2) in each storage compartment 12, 13 at S110.

The temperature is measured by each of the temperature sensors 1b, 1c located in each storage compartment 12, 13, and the measured temperatures (CT, CT2) are provided to the controller 70.

The controller 70 continuously performs the normal storage operation at S110 for the first storage compartment 12 while controlling the cooling power control means based on the acquired internal temperature (CT, CT2).

The normal storage operation is performed to maintain the temperature area of the satisfaction region (the temperature area between the upper limit notch temperature (NT+diff, NT2+diff) and the lower limit notch temperature (NT−diff, NT2−diff) set based on the set notch temperature (NT, NT2) of each storage compartment) based on the set notch temperature (NT, NT2) of each storage compartment.

That is, by checking the internal temperature of each storage compartment (CT, CT2) at S111 and S114, when the temperature of each storage compartment (CT, CT2) reaches the upper limit notch temperature (NT+diff, NT2+diff), the compressor 60 is operated and the cold air is supplied (or increased) at S112 and S115, and when the temperature of each storage compartment (CT, CT2) reaches the lower limit notch temperature (NT−diff, NT2−diff), the compressor 60 stops operating and stops supplying cold air at S113 and S116. By continuously repeating this control, the normal storage operation is performed. This is as shown in the accompanying flowchart of FIG. 7.

Of course, the compressor 60 may be controlled to be operated before the internal temperature of each storage compartment (CT, CT2) reaches the upper limit notch temperature (NT+diff, NT2+diff) or when reaching the dissatisfaction region exceeding the upper limit notch temperature (NT+diff, NT2+diff).

In particular, the normal storage operation is preferentially operated in the first storage compartment 12. That is, even if both the internal temperature of the first storage compartment 12 and the second storage compartment 13 are in the dissatisfaction region, the internal temperature (CT) of the first storage compartment 12 is preferentially operated to reach the satisfaction region, and then the internal temperature (CT2) of the second storage compartment 13 is operated to reach the satisfaction region.

This is because in the first storage compartment 12, there is a concern that the stored items may deteriorate even if a small temperature change occurs, whereas in the case of the second storage compartment 13, the occurrence of a temperature change does not significantly affect the stored items.

Of course, when the first storage compartment 12 is in the dissatisfaction region or reaches the upper limit notch temperature (NT+diff) even while cold air is being supplied to the second storage compartment 13, the operation for the second storage compartment 13 is switched to the operation for the first storage compartment 12.

At this time, the compressor 60 constituting the refrigeration system during the normal storage operation is controlled to operate at a lower output than during the load operation.

When the doors 12a, 13a are opened while the normal storage operation is performed at S110, the controller 70 checks whether the start condition of the load operation is satisfied at S120.

The start condition of the load operation may include at least any one of the following conditions: a condition in which the temperature in the storage compartments 12, 13 are increased by more than the set condition temperature (input condition temperature) ($\Delta t$) within the set elapsed time (T); a condition in which the temperature change rate increased per unit time with respect to the temperature in the storage compartments 12, 13 is higher than the predetermined set change rate; and a condition in which at least one of the temperature in the storage compartments 12, 13 is in the dissatisfaction region. At this time, the dissatisfaction region is a temperature higher than the upper limit notch temperatures (NT+diff, NT2+diff).

When the start condition of the load operation is satisfied while the normal storage operation S110 is performed, the load operation S130 is performed (refer to attached FIG. 8).

For example, the load operation is performed by controlling the operation of the cooling power control means at S132 when it is confirmed that the internal temperature rises above the set condition temperature ($\Delta t$) within the set elapsed time (T) by checking the internal temperature and counting the elapsed time at S131 after the doors 12a, 13a are opened.

The load operation S130 is performed with higher cooling power than the normal storage operation S110. When the load operation S130 is performed, the operation termination condition for the load operation S130 is checked at S140, and when the operation termination condition is satisfied, the load operation S130 is terminated at S150.

When the load operation S130 is terminated, the controller performs the normal storage operation S110 while controlling the cooling power control means (compressor and each cooling fan) based on the internal temperature (CT, CT2) in each storage compartment 12, 13.

In particular, when the load operation is terminated and the normal storage operation is performed, the controller 70 performs the re-input prevention control S160 to prevent re-input of the load operation so that the continuous load operation is not performed.

The re-input prevention control S160 is controlled at S161 so that the load operation is not performed even if the start condition of the load operation is satisfied.

The re-input prevention control counts an elapsed time at S162 from the end of the load operation to prevent re-input of the load operation during the re-input prevention time, and terminates the re-input prevention control at S180 to perform the load operation when the re-input prevention time elapses.

Of course, the controller 70 terminates the re-input prevention control S180 when it is confirmed that the re-input prevention stop condition is satisfied at S170 even if the re-input prevention time does not elapse. This is as shown in the attached flowchart of FIG. 9.

That is, when the first storage compartment 12 and the second storage compartment 13 are alternately operated without opening the door 12a of the first storage compartment 12, if the temperature of the first compartment 12 falls within the satisfaction region at least twice, it is determined that the re-input prevention stop condition is satisfied and the re-input prevention control is terminated.

In addition, when the first storage compartment 12 and the second storage compartment 13 are alternately operated without opening the door 12a of the first storage compartment 12, if the temperatures of the first storage compartment 12 and the second storage compartment 13 simultaneously belong to the satisfaction region, it is determined that the re-input prevention stop condition is satisfied and the re-input prevention control is terminated.

That is, when the internal temperature of the two storage compartments 12, 13 all belong to the satisfaction region, it is determined that the internal temperature is stabilized (the temperature change is insignificant), and the re-input prevention control is terminated.

In addition, when the first storage compartment 12 and the second storage compartment 13 are alternately operated without opening the door 12a of the first storage compartment 12, when the compressor 60 is turned off, it is determined that the re-input prevention stop condition is satisfied and the re-input prevention control is terminated.

That is, when the operation of the compressor 60 is stopped (turned off) as the internal temperatures in the two storage compartments 12, 13 all belong to the satisfaction region, the re-input prevention control is terminated.

In addition, when the internal temperatures of the first storage compartment 12 and the second storage compartment 13 are in the satisfaction region at the same time when the door 12a of the first storage compartment 12 is opened while the re-input prevention control is performed after the load operation is completed, it is determined that the re-input prevention stop condition is satisfied and the re-input prevention control is terminated.

For example, when the internal temperature of the first storage compartment 12 is higher than the set notch temperature (NT) or the lower limit notch temperature (NT−diff), and the internal temperature of the second storage compartment 13 is lower than the upper limit notch temperature (NT2+diff) or the set notch temperature (NT2), the re-input prevention control is terminated. That is, even if the load operation is re-input, the risk of over-cooling of the first storage compartment 12 may be prevented, and if the internal temperature is maintained enough to reduce power consumption required for the temperature drop of the second storage compartment 13, the re-input prevention control is terminated.

And when the re-input prevention control of the load operation is terminated and the normal storage operation is performed, if the start condition of the load operation is satisfied, the load operation is controlled to be performed.

In this way, after the load operation is completed, the re-input prevention control is performed until the re-input prevention time elapses, thereby preventing over-cooling of the first storage compartment by preventing the continuous input of the load operation.

In addition, before the re-input prevention time elapses, the load operation is re-input only for a large load, while the load operation is not re-input for a small load.

That is, when the door is opened for a long time or a temperature rise that greatly exceeds the start condition of the load operation (e.g., a temperature rise above 4° C. for 5 minutes after the door is opened) occurs, the re-input prevention control is terminated and the load operation is controlled to be performed. Meanwhile when a temperature rise that barely satisfies the start condition of the load operation (e.g., 2.0° C. rise for 5 minutes after the door is opened) occurs, the re-input prevention control is maintained and the re-input of the load operation is prevented.

Therefore, while overcooling of the first storage compartment 12 due to continuous performing of unnecessary load operation is prevented, the internal temperature of the second storage compartment 13 is maintained in the satisfaction region. When a large load is input (high-temperature storage items are stored) into the storage compartments 12 and 13, the re-input prevention control is forcibly terminated, thereby preventing a problem in which the load operation is not input.

As described above, the refrigerator and the control method thereof according to the present disclosure prevent overcooling of the first storage compartment 12 by preventing the continuous input of the load operation while performing the re-input prevention control until the re-input prevention time elapses after the load operation is completed.

In addition, in the refrigerator and the control method thereof according to the present disclosure, even before the re-input prevention time elapses after the load operation is completed, if the re-input prevention stop condition is satisfied, the re-input prevention control is terminated and the load operation is performed. Accordingly, it is possible to avoid not performing the load operation when there is an excessive load. This is as shown in the attached FIG. 10.

The invention claimed is:

1. A refrigerator, comprising:
a cabinet having a first storage compartment, and a second storage compartment maintained at a lower temperature than the first storage compartment;
a first door for opening and closing the first storage compartment and a second door for opening and closing the second storage compartment;
a first temperature sensor for measuring a temperature inside the first storage compartment and a second temperature sensor for measuring a temperature inside the second storage compartment;
a cooling source for generating cold air that is supplied to the first and second storage compartments;
a controller configured to control the cooling power of the cold air supplied to the first and second storage compartments,
wherein the controller is configured to control the cooling power to perform one of a normal storage operation and a load operation,
wherein, in the configuration of the controller,
when a start condition of the load operation is satisfied, the load operation is performed,
when a termination condition of the load operation is satisfied, the load operation is terminated and the normal storage operation is performed,
when the normal storage operation is performed after the load operation is terminated, a re-input prevention control is performed so that the load operation is not performed although the start condition of the load operation is satisfied, and
when a re-input prevention stop condition of the load operation is satisfied while the re-input prevention control is performed, the re-input prevention control is stopped to allow the load operation to be performed when the start condition of the load operation is satisfied.

2. A control method for the refrigerator, the method comprising:
a normal storage operation step in which cold air is supplied into first and second storage compartments to maintain temperatures in the first and second compartments in a satisfaction region while performing the normal storage operation;
a load operation step in which the load operation is performed in response to a start condition of the load operation being satisfied in response to at least one of a door of the first storage compartment or a door of the second storage compartment being opened during the normal storage operation until a termination condition of the load operation is satisfied; and
a re-input prevention step in which the normal storage operation is performed without performing the load operation although the start condition of the load operation is satisfied until a re-input prevention stop condition is satisfied to allow the load operation to be performed in response to the start condition of the load operation being satisfied.

3. The method of claim 2, wherein in the normal storage operation step, the satisfaction region of the temperature in the first storage compartment is a temperature region between a first upper limit notch temperature (NT+diff) and a first lower limit notch temperature (NT−diff) set based on a first set notch temperature (NT), and
    the satisfaction region of the temperature in the second storage compartment is a temperature region between a second upper limit notch temperature (NT2+diff) and a second lower limit notch temperature (NT2−diff) set based on a second set notch temperature (NT2).

4. The method of claim 2, wherein the re-input prevention stop condition of the re-input prevention step includes a case where a preset re-input prevention time elapses after the load operation is terminated.

5. The method of claim 2, wherein the re-input prevention stop condition of the re-input prevention step includes a case where the temperature of the first storage compartment falls at least twice within the satisfaction region, and the first and the second storage compartments are operated without opening the door of the first storage compartment.

6. The method of claim 2, wherein the re-input prevention stop condition of the load operation-includes a case where both the first and second storage compartments have temperatures that are within the satisfaction region and the first and the second storage compartments are operated without opening the door of the first storage compartment.

7. The method of claim 2, wherein the re-input prevention stop condition of the load operation includes a case where an operation of a compressor is turned off and the first and the second storage compartments are operated without opening the door of the first storage compartment.

8. The method of claim 2, wherein the re-input prevention stop condition of the load operation includes a case where the temperature of the first storage compartment and the temperature of the second storage compartment are both within the satisfaction region simultaneously and the door of the first storage compartment is opened while the re-input prevention control is being performed after the load operation is terminated.

9. The method of claim 8, wherein the satisfaction region of the temperature of the first storage compartment is a temperature region higher than a first set notch temperature (NT).

10. The method of claim 8, wherein the satisfaction region of the temperature of the first storage compartment is a temperature region higher than a first lower limit notch temperature (NT−diff) set based on a first set notch temperature (NT).

11. The method of claim 8, wherein the satisfaction region of the temperature of the second storage compartment is a temperature region lower than a second set notch temperature (NT2).

12. The method of claim 8, wherein the satisfaction region of the temperature of the second storage compartment is a temperature region lower than the second upper limit notch temperature (NT2+diff) set based on the second set notch temperature (NT2).

13. The method of claim 2, wherein the re-input prevention stop condition of the re-input prevention step has a different base value from the start condition of the load operation in the load operation step.

14. The method of claim 2, wherein the start condition of the load operation includes a condition in which an internal temperature of the refrigerator rises above a set condition temperature (Δt) within a set elapsed time (T) after at least one of the door of the first storage compartment or the door of the second storage compartment is opened.

15. The method of claim 14, wherein the re-input prevention stop condition in the re-input prevention step includes a condition in which the internal temperature of the refrigerator rises above the set condition temperature (Δt) within the set elapsed time (T) after at least one of the door of the first storage compartment or the door of the second storage compartment is opened.

16. The method of claim 14, wherein the re-input prevention stop condition in the re-input prevention step includes a condition in which the internal temperature of the refrigerator rises above the set condition temperature (Δt) within a shorter time than the set elapsed time (T) after at least one of the door of the first storage compartment or the door of the second storage compartment is opened.

17. The method of claim 2, wherein while the re-input prevention step is being performed, in response to the re-input prevention stop condition of the load operation being satisfied, the re-input prevention control is stopped and the normal storage operation is performed.

18. The method of claim 17, wherein while the normal storage operation is being performed after the re-input prevention control is stopped, in response to the start condition of the load operation being satisfied, the load operation is performed.

* * * * *